United States Patent [19]
Byers et al.

[11] Patent Number: 5,787,915
[45] Date of Patent: Aug. 4, 1998

[54] SERVO POSITIONING SYSTEM

[75] Inventors: J. Otto Byers, Kalamazoo, Mich.; Lambert Haner, Rocky River, Ohio

[73] Assignee: J. Otto Byers & Associates, Kalamazoo, Mich.

[21] Appl. No.: 788,891

[22] Filed: Jan. 21, 1997

[51] Int. Cl.$^6$ .................. F15B 13/044; F16K 31/08
[52] U.S. Cl. .................. 137/1; 137/554; 137/625.65; 251/65; 251/129.04; 251/129.08; 251/129.1; 318/653
[58] Field of Search .................. 137/1, 554, 625.65; 251/65, 129.04, 129.08, 129.1; 318/653

[56] References Cited

U.S. PATENT DOCUMENTS

| | | | |
|---|---|---|---|
| 3,723,871 | 3/1973 | Runyan et al. | 324/99 R |
| 3,835,888 | 9/1974 | Leutner et al. | 137/625.62 |
| 4,251,762 | 2/1981 | Williams | 318/653 |
| 4,359,677 | 11/1982 | Dennon | 318/687 |
| 4,585,029 | 4/1986 | Harding | 137/625.62 |
| 4,605,197 | 8/1986 | Casey et al. | 137/625.61 X |
| 4,656,400 | 4/1987 | Pailthorp et al. | 318/135 |
| 4,659,969 | 4/1987 | Stupak | 318/128 |
| 4,665,348 | 5/1987 | Stupak | 318/135 |
| 4,809,742 | 3/1989 | Grau | 137/554 |
| 4,825,904 | 5/1989 | Grau et al. | 137/554 |
| 4,842,162 | 6/1989 | Merkel | 222/1 |
| 4,907,615 | 3/1990 | Meyer et al. | 137/1 |
| 4,953,590 | 9/1990 | Kakinuma et al. | 137/554 |
| 5,091,665 | 2/1992 | Kelly | 310/12 |
| 5,244,002 | 9/1993 | Frderick | 137/1 |
| 5,249,603 | 10/1993 | Byers | 137/625.65 |
| 5,257,014 | 10/1993 | Zimmermann | 137/554 X |
| 5,320,123 | 6/1994 | Corso et al. | 137/1 |

OTHER PUBLICATIONS

Denison—Hydraulics, Proportional Directional Valves, pp. 1–2, 1993.

*Primary Examiner*—Gerald A. Michalsky
*Attorney, Agent, or Firm*—Baker & Daniels

[57] ABSTRACT

A valve positioning system according to the present invention includes a force motor which responds to a command signal corresponding to a desired valve flow rate by energizing magnetic coils with a current to produce a flux force which moves the valve. Preferably two Hall effect sensors sense the actual position and provide a feedback signal to a control loop which compares the sensed position with the commanded position. The valve is positioned by adjusting the energizing current provided to the magnetic coils. The system optionally includes circuitry to compensate for the error in the actual position relative to the commanded position produced by changes in current in the magnetic coils.

21 Claims, 10 Drawing Sheets

4-WAY VALVE AND 2 COIL MOTOR

4-WAY VALVE AND 2 COIL MOTOR

FIG. 4    4 WAY VALVE AND ONE COIL MOTOR

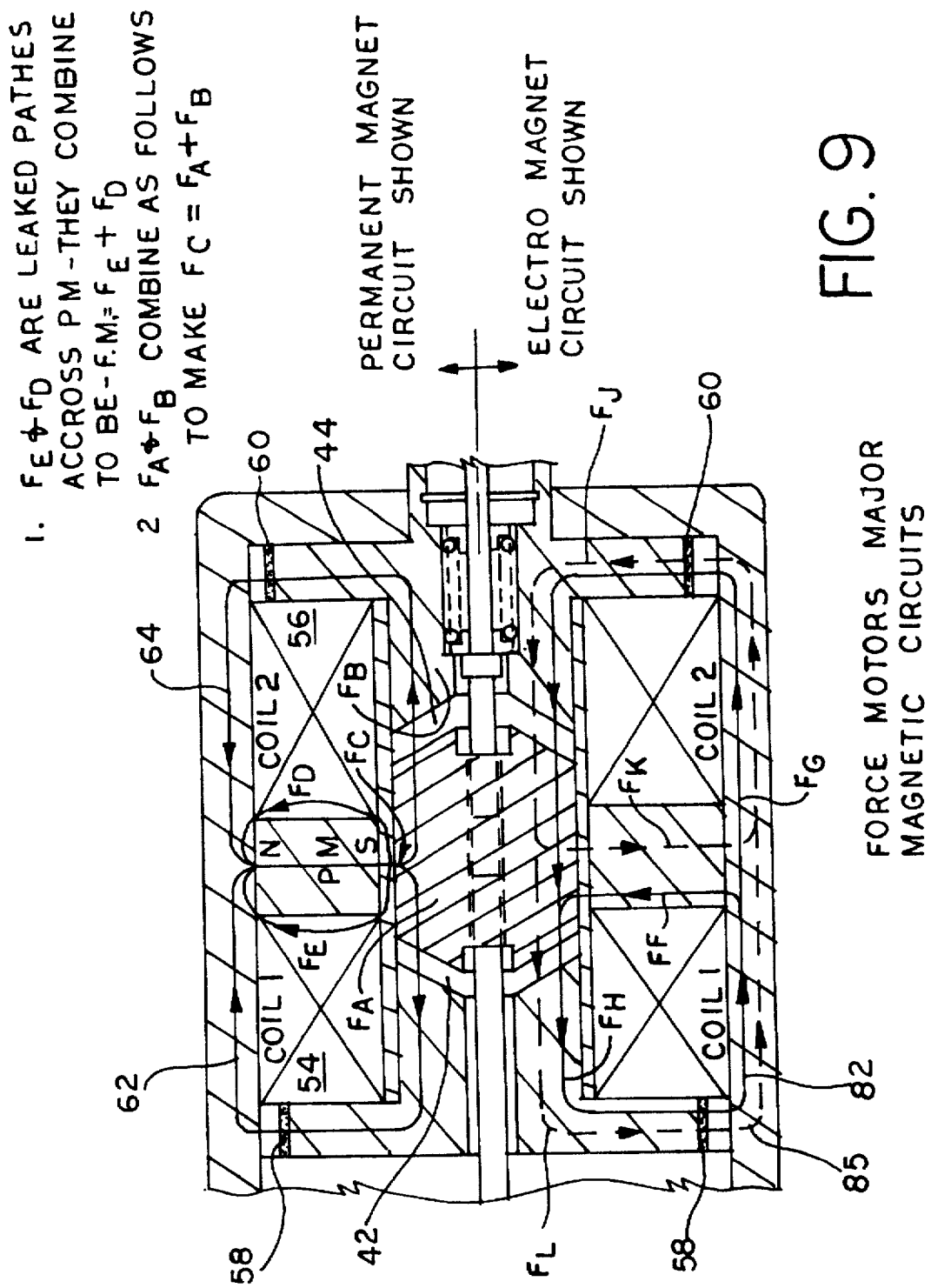

SERVO POSITIONING SYSTEM

This invention relates to a positioning system for an electro-hydraulic servo with specific but not limited application to a valve. The system includes a force motor with magnetic coils which position the valve in response to a command signal to accomplish a desired flow rate. Hall effect sensors which sense the actual valve position and/or flow rate, and a control circuit which repositions the valve in response to the sensed position.

BACKGROUND OF THE INVENTION

Typical hydraulic systems utilize large force electromagnetic drivers to position directional control valve spools. For example, electrically actuated valves usually have two solenoids, one positioned on either side of the valve, to provide actuation of the spool in two directions. Some applications cause the spool to move between three positions—center, flow to control port A or flow to control port B. Some applications allow for flow proportional to the current applied to the solenoids by causing the solenoid force which is related to current level to act against a spring. Some applications have position feedback and electronic control for spool position which is generally provided by an LVDT to cause the spool to move to precise positions that match precise command signals.

Casey et al. in U.S. Pat. No. 4,605,197 (assigned to Fema Corp.) discloses a pilot valve having only one linear force motor using a permanent magnet. The permanent magnet allows the force motor to actuate the spool bi-directionally. Byers in U.S. Pat. Nos. 5,264,813 and 5,249,603, (both assigned to Caterpillar Corp.) discloses a single stage valve with a single force motor which drives the spool in either direction with enough force to overcome the forces acting on the spool.

Spool position feedback which provides greatly increased system gain, and some flow rate control such that the flow through the valve is somewhat proportional to input current is common, and Thomas R. Frederick, in U.S. Pat. No. 5,244,002, provides position feedback using Hall effect sensors to sense the flux density from a special permanent magnet which provides servo valve spool position feedback.

It is advantageous for valves of this type to actually control flow rate, regardless of pressure drop across the main stage valve spool. Byers in U.S. Pat. No. 3,561,488 provided a means to do this in a two stage proportional valve.

SUMMARY OF THE INVENTION

This patent provides a single stage single rectilinear force motor driven proportional valve or servo-valve with high gain where the working flux density from a permanent magnet that is required to make the valve bi-directional is sensed to provide the spool position. It also provides a way to compensate for the flow variation caused by changes in pressure drop across the valve spool in a single stage proportional and/or servo valve.

In accordance with the invention, the rectilinear force motor provides sufficient force and travel to control the positions of a single stage proportional and/or servo valve such that the four-way valve spool is positioned for direction and degree of opening proportional to the command voltage or current, or in one version the spool is positioned to a variable position which corrects for the error caused by varying pressure drop across the spool. The feedback for the single stage valve is provided by measuring the flux density in the two working flux paths with flux density sensors, summing the output of the sensors, then combining the combined signal with a command signal that may be modified by a signal that is proportional to the voltage or current flow rate and direction of the working current through the force motor. The result is a more compact, less expensive, more accurate, single stage servo valve. The valve also may provide higher force levels which eliminates the contamination problems associated with most proportional and servo valves both single stage and multiple stage.

BRIEF DESCRIPTION OF THE DRAWINGS

The above-mentioned and other objects and advantages of this invention, and the manner of attaining them, will become more apparent and the invention will be better understood by reference to the following description of embodiments of the invention taken in conjunction with the accompanying drawings, wherein:

FIG. 9 is a fragmented longitudinal section view of the force motor showing the magnetic circuits for both the permanent magnetic and electro-magnetic circuits generated by the coils.

Figure 1:
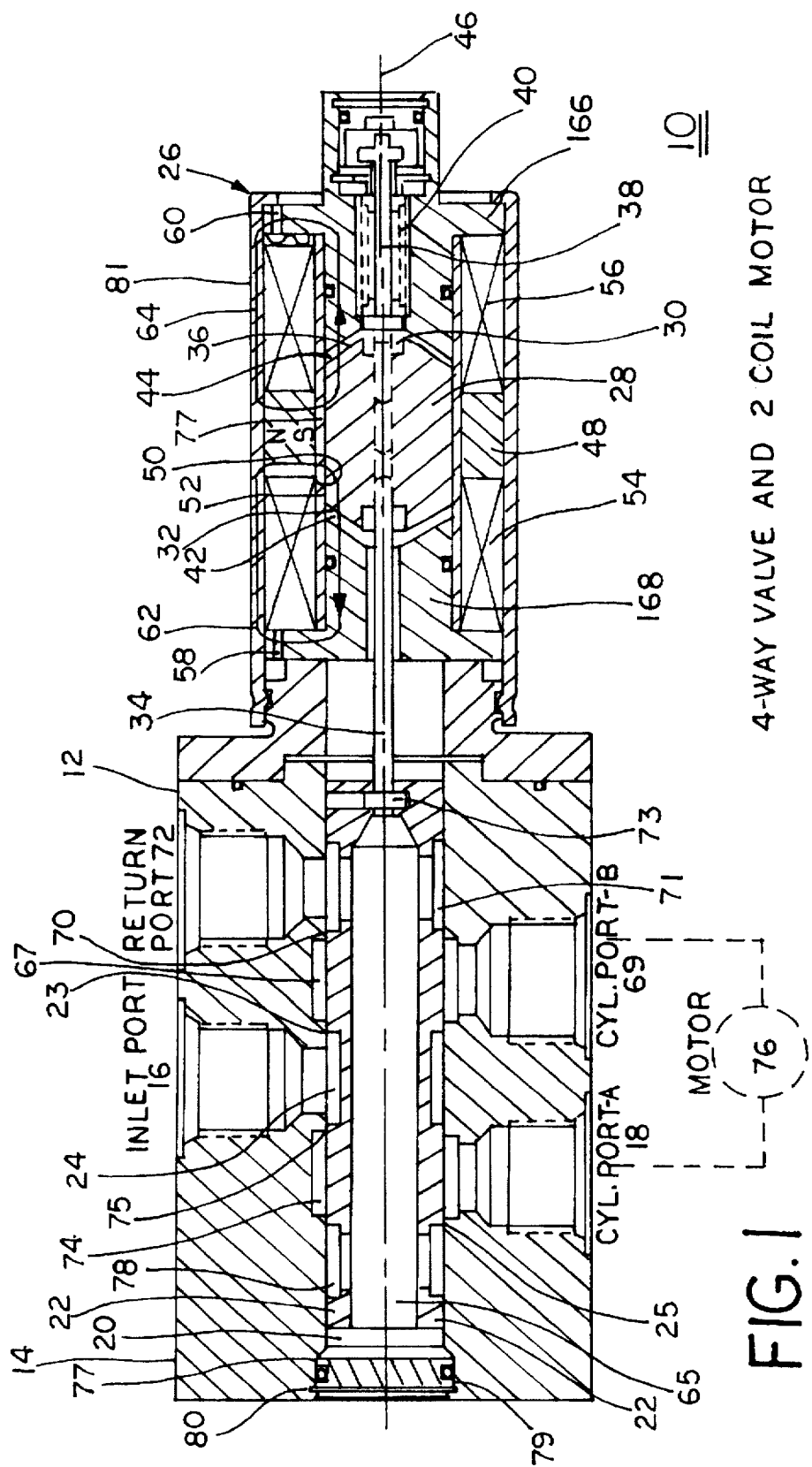
FIG. 1 is a longitudinal sectional view of the positioning system of the present invention shown in conjunction with a valve.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE INVENTION

The embodiments disclosed in the detailed description below are not intended to be exhaustive or to limit the invention to the precise forms disclosed. Rather, the embodiments selected for the description are disclosed so that others skilled in the art may utilize their teachings.

FIG. 1 shows the present invention 10 in conjunction with a hydraulic valve assembly 12. Valve assembly 12 may be used to control the flow of hydraulic fluid to a hydraulic motor, or a hydraulic cylinder. The operation of valve assembly 12 is commonly known in the art as is evidenced by U.S. Pat. No. 5,249,603 which is incorporated herein by reference.

Figure 2:
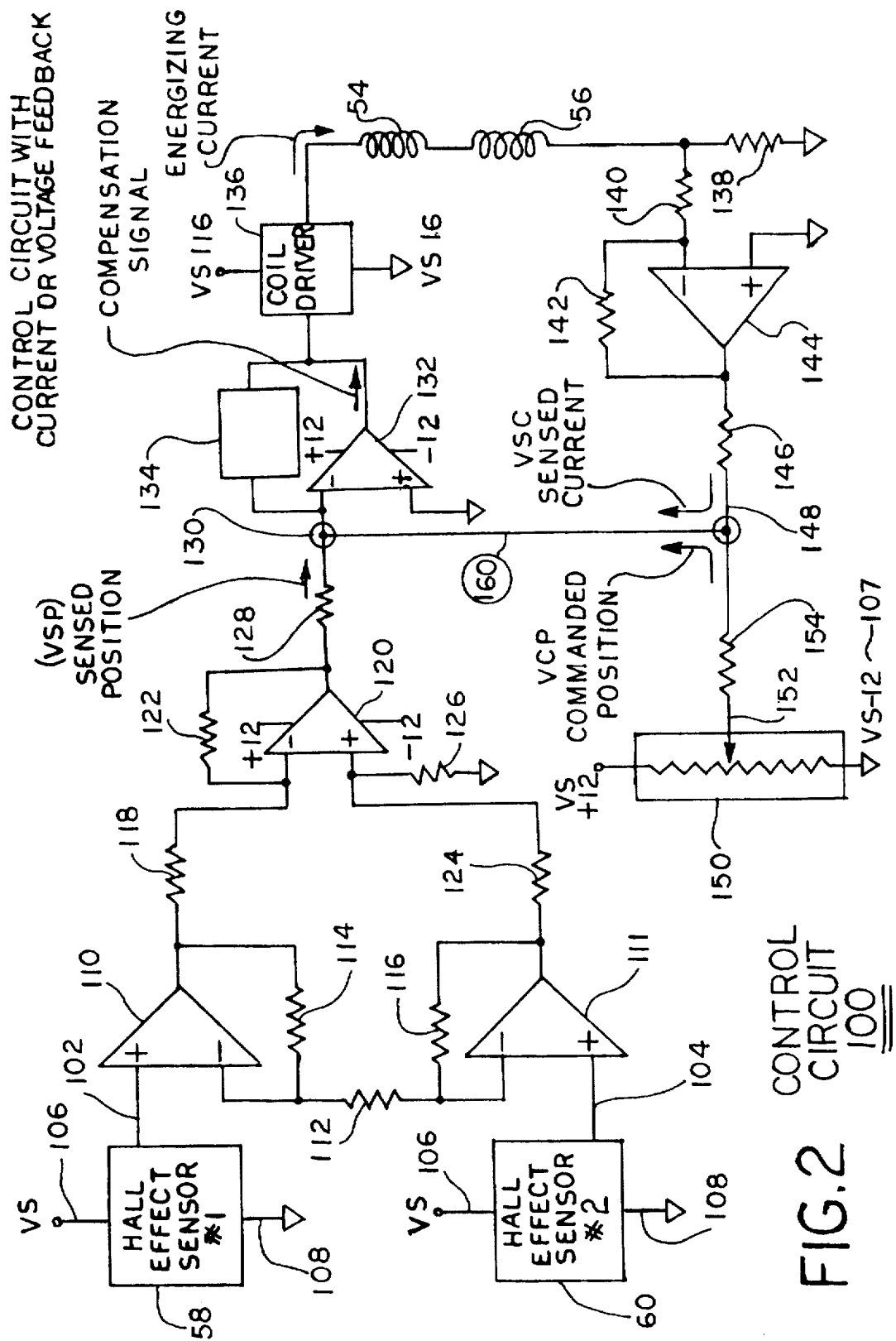
FIG. 2 is a schematic diagram of the control circuit of the present invention with current feedback.

Generally, valve 12 is enclosed within a housing 14 which includes an inlet port 16, cylinder port 18, cylinder port 69 and return port 72. A spool is disposed within bore 20. Spool 22 is moveable to the left and to the right. If it moves to the left, annulus 24 is connected across metering orifice 75 to annulus 74 and to cylinder port 18 to motor 76. The return flow from the motor enters port 69, passes through annulus 67, across metering orifice 70 to annulus 71 and to return port 72. If the spool is moved to the right, annulus 24 is connected across metering orifice 23 to annulus 67 to cylinder port 69 to motor 76, and back into port 18. It then passes through annulus 74 across metering orifice 25 to annulus 78, through passage 65 to annulus 71 and to the return port 72. The design of the force motor 26 and electronic circuit per FIG. 2 are such that the spool 22 can be commanded to stay in any commanded position from center to any opening to port A or to any opening to port B, or to pass any flow rate to port A or B regardless of pressure drop (i.e. the pressure differential between port A and port B) across the spool within broad tolerances. Plug 77 seals the left end on bore 20. Drive rod 34 is connected by universal joint 73 to spool 22 in a manner that allows drive rod 34 to move spool 22 in either direction freely even if the bore is not in perfect alignment with the drive rod 34. The drive forces for the spool 22 are the magnetic forces in air gaps 42 and 44 between moveable armature 28 and pole pieces 166 and 168 or by centering spring assembly 40 through rod 38.

As armature 28 moves fore and aft along axis 46, drive rod 34 moves spool 22 within valve bore 20 so that either flow passes across metering orifice 75 to port A and from port 69 across metering orifice 70 to return port 72, or passes across metering orifice 23 to port 69 and from port 18 across metering orifice 25 to the return port 72.

In an exemplary embodiment, linear force motor 26 includes an armature 28 situated within a cavity 30 defined by tube 77. Armature 28 has a forward side 32 connected by drive rod 34 to spool 22, and a rearward side 36 connected by support rod 38 to spring assembly 40 which biases armature 28 to a central position within cavity 30. Forward side 32 of armature 28 forms a forward gap 42 with forward pole piece 168, and rearward side 36 forms a rearward gap 44 with rearward pole piece 166. Armature 28 is freely movable rectilinearly within cavity 30 along an axis 46 defined by rods 34,38. Also, as armature 28 moves along axis 46, forward gap 42 and rearward gap 44 increase and decrease in direct, inverse relationship to one another as will be described in further detail below.

Armature 28 is surrounded by a permanent magnet 48 which has an annular shape with radial magnetization as noted by poles "N" and "S." Permanent magnet 48 has an internal surface 50 which is closely spaced from an external surface 52 of armature 28. As is well known in the art, permanent magnet 48 can be fabricated in a single piece or multiple piece construction using one of various types of permanent magnetic materials. The dimensions of permanent magnet 48 depend upon the desired output force of motor 26 and material selected.

Figure 3:
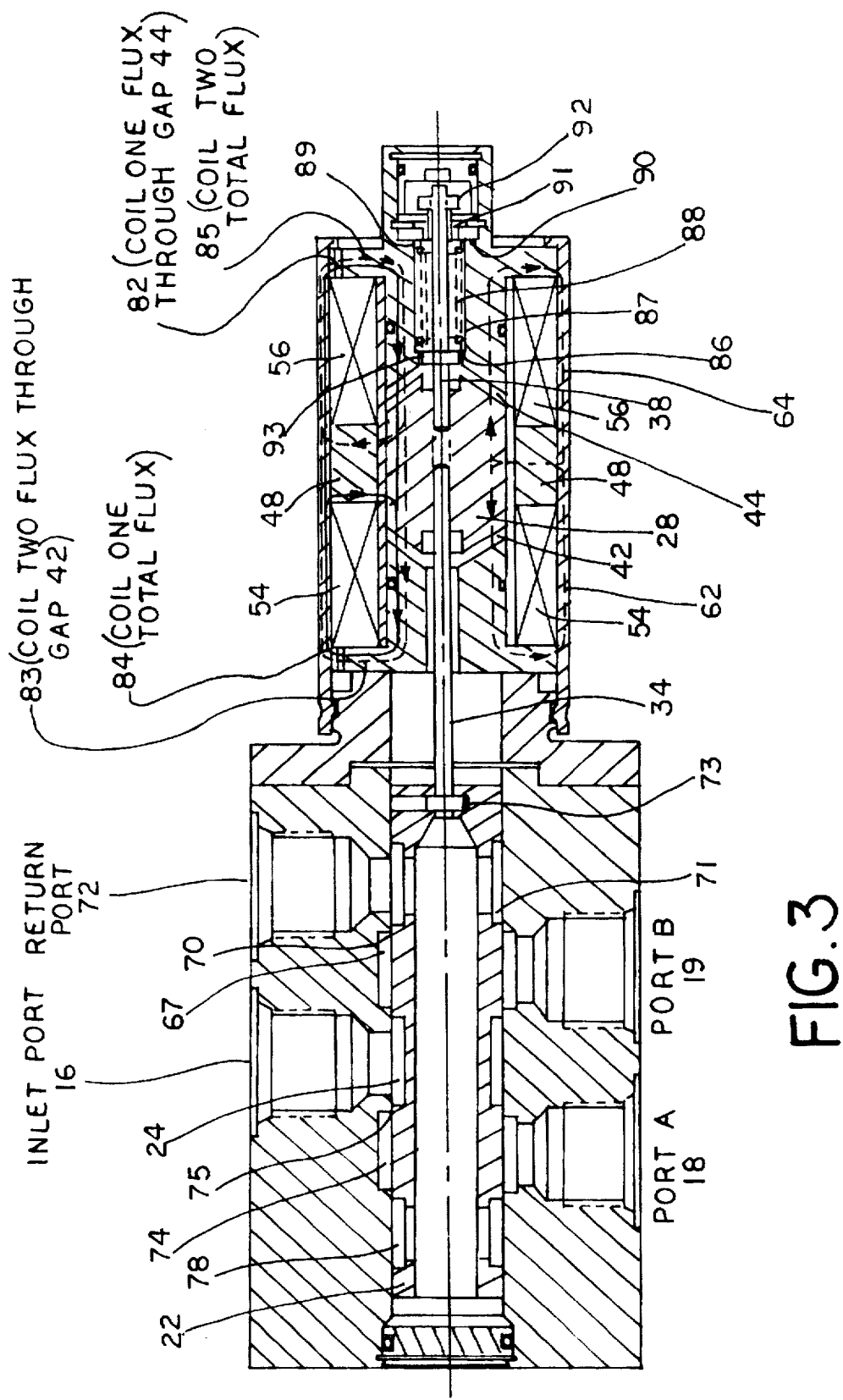
FIG. 3 is a longitudinal sectional view of the positioning system maintaining a valve in an operational position (also shows magnetic circuits)

First and second electromagnetic coils 54,56 are of annular shape and positioned on opposite ends of permanent magnet 48. Coils 54,56 are each wound on a non-magnetic core (not shown) of substantial tubular shape. First coil 54 is electrically connected to second coil 56 generally in a series circuit. Both are wound in the same direction. A first Hall effect sensor 58 is disposed directly adjacent first coil 54 within outer housing 81 to measure the flux 62 associated with forward gap 42. A second Hall effect sensor 60 is disposed directly adjacent second coil 56 within outer housing 81 to measure the flux 64 associated with rearward gap 44. Sensors 58,60, which are commercially available, generate electricity in response to magnetic flux. The manner in which sensors 58,60 provide flux measurements is well known in the art and does not constitute a part of the present invention. As shown in FIGS. 3 and 9, flux generated by the permanent magnet and coils flows around coils 54,56 and passes through sensors 58,60. This causes sensors 58,60 to generate respective electrical voltages which are proportional to the magnitude and direction of the magnetic flux density passing through the sensors. First sensor 58 produces a voltage on output line 102 (shown in FIG. 2) which corresponds to measured flux 62. Likewise, second sensor 60 produces a voltage on output line 104 (shown in FIG. 2) which corresponds to measured flux 64. The polarities of the voltages on lines 102,104 depend upon the direction of flow of flux currents 62, 64, 82, 83, 84 and 85. A typical commercially available Hall effect sensor also provides an integral amplification stage that increases the voltage output of the sensor to a usable level. This voltage is above or below a baseline voltage depending on the direction of flux flow. The sensor outputs on lines 102,104 have opposite polarities from the baseline by arrangement and provide a measure of armature 28 position when processed by control circuit 100 as described in detail below.

Referring to FIG. 2, Hall sensors 58,60 are each connected between supply voltage 106 and ground 108. In an exemplary embodiment, output line 102 is connected to the positive input of driver 110, and output line 104 is connected to the positive input of driver 111. The negative input of driver 110 is connected to resistor 112 and resistor 114. The negative input of driver 111 is connected to resistor 112 and resistor 116. Driver 110 output is connected to resistor 114 and resistor 118 which is connected to the negative input of difference amplifier 120. Resistor 118 is also connected to resistor 122 which is connected to the output of difference amplifier 120. Driver 111 output is similarly connected to resistor 116 and resistor 124 which is connected to the positive input of difference amplifier 120. Resistor 124 is also connected to resistor 126 which is connected to ground 108. The output of difference amplifier 120 (i.e., the sum of the two inputs to the amplifier), is routed to resistor 128 which is connected to the summing junction 130 and the control amplifier 132.

A compensation network 134 is connected between summing junction 130 and control amplifier 132 output. The positive input to control amplifier 132 is connected to ground 108. The output of control amplifier 132 (the "Compensation" signal) is connected to the coil driver 136 which is, in turn, connected to first coil 54. As previously mentioned, first coil 54 and second coil 56 are connected together in series. Second coil 56 is also connected to resistor 138 and resistor 140. Resistor 140 is connected to the negative input of the current compensation amplifier 144 and feedback resistor 142. Resistor 138 is connected to ground 108. The positive input of current compensation amplifier 144 is also connected to ground 108. Resistor 142 is connected to resistor 146 at the output of current compensation amplifier 144. A "Sensed Current" signal ($V_{SC}$) is produced on line 148 which is routed back to summing junction 130. Finally, command block 150, which is shown as a commonly available potentiometer in FIG. 2, provides a "Commanded Position" signal ($V_{CP}$) to summing junction 130. Command block 150 is connected to positive supply voltage 106 on one end, negative supply voltage 107 on the other end, and wiper 152 in a variable voltage divider configuration commonly known to those skilled in the art. Wiper 152 can be adjusted using various electrical or mechanical means. Wiper 152 provides the "Commanded Position" signal through resistor 154 on line 148 which is routed to summing junction 130.

Figure 4:
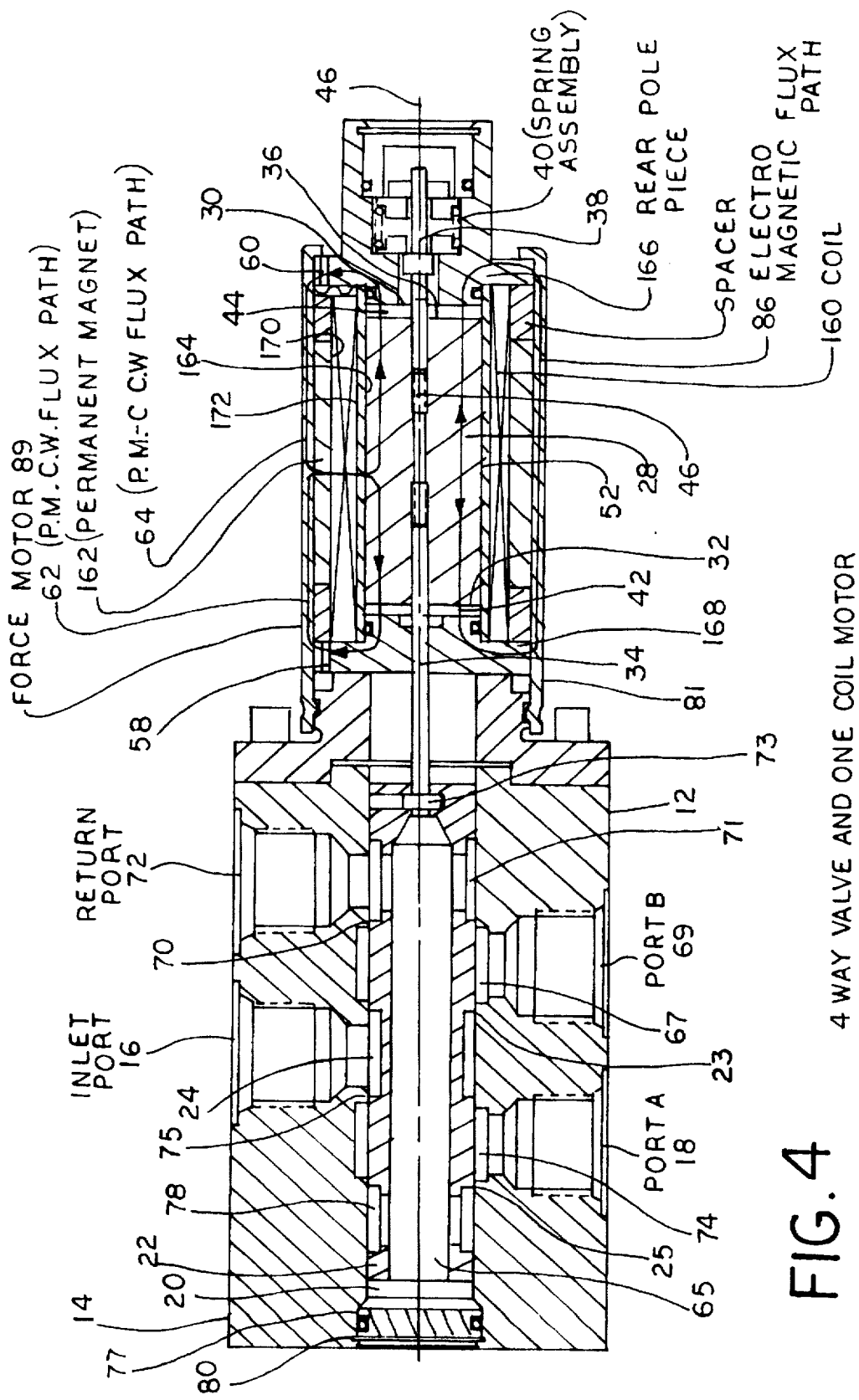
FIG. 4 is a longitudinal sectional view of another embodiment of the positioning system of the present invention shown in conjunction with a valve.

An additional embodiment of the force motor of the present invention is shown in FIG. 4. Like the motor of FIG. 1, the motor of FIG. 4 has an armature 28 enclosed within a cavity 30. The armature 28 shifts along an axis 46 defined by rods 34 and 38 connected to armature 28. The forward side 32 of armature 28 forms a forward gap 42 with the forward pole piece 168 and the rearward side 36 forms a rearward gap 44 with the rearward pole piece 166. Unlike the previously described motor, the motor of FIG. 4 has a single coil 160 which is closely spaced from the external surface 164 of armature 28. Coil 160 has sufficient length to extend axially beyond forward gap 42 and rearward gap 44. Two pole pieces 166 and 168 are disposed within outer housing 81 in proximity to the ends of coil 160. A permanent magnet 162 surrounds coil 160. In an exemplary embodiment, the inner surface 170 of permanent magnet 162 mates with the outer surface 172 of coil 160. Hall effect sensor 58 is positioned within pole piece 168 in operable association with gap 42. Hall effect sensor 60 is positioned within pole piece 166 in operable association with gap 44. As should be apparent to one skilled in the art, this version is less efficient than FIG. 1, but since all of the flux from the coil goes through both gaps, 42 and 44, the reluctance in the electromagnetic circuit 86 does not change with position of the armature, and the flux per ampere turn will also not change with armature position. The relationship between the actual spool position and the command position for control loop according to FIG. 2 and a motor per FIG. 4 is shown in FIG. 7.

Figure 5:
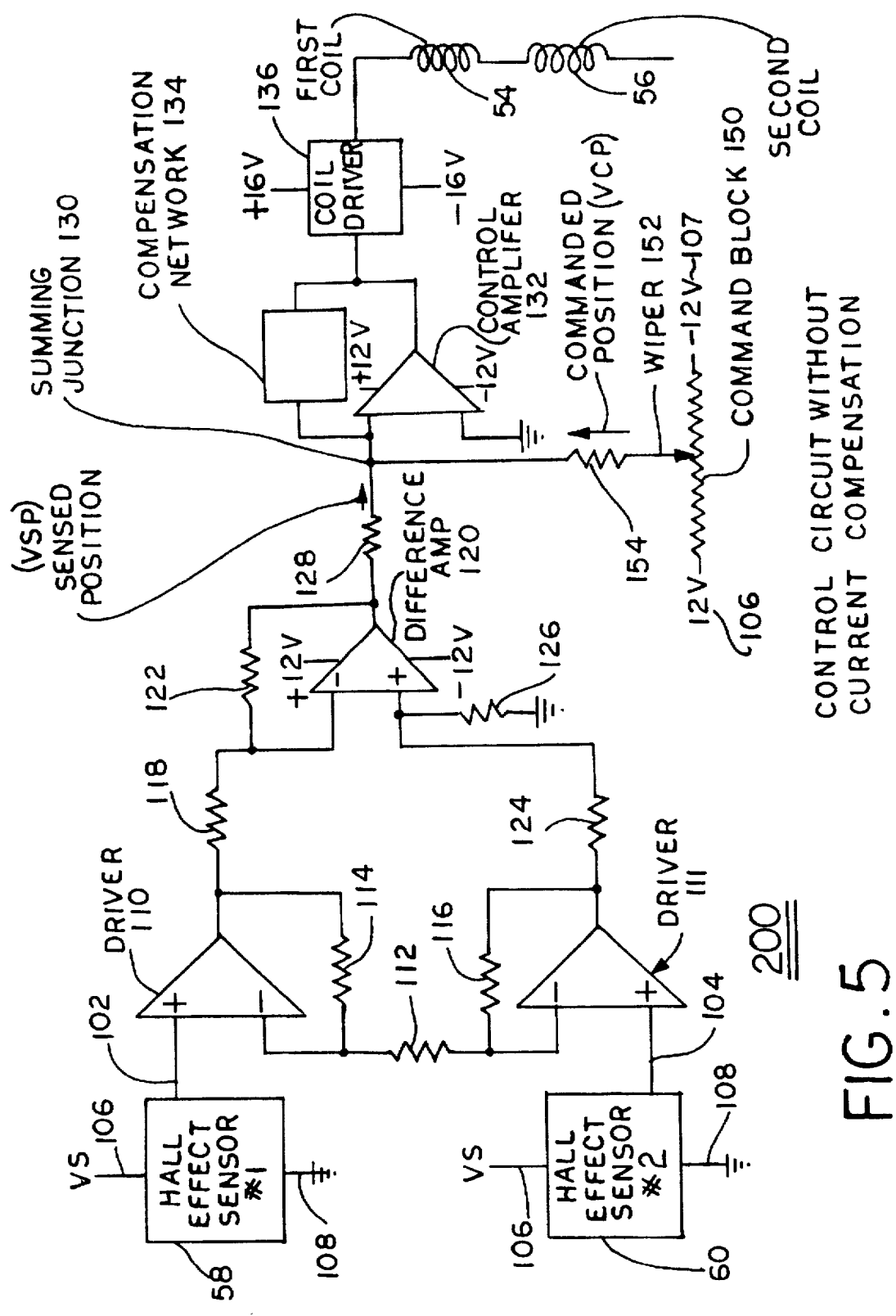
FIG. 5 is a schematic diagram of the control circuit similar to that shown in FIG. 2, but without current feedback.
Figure 6:
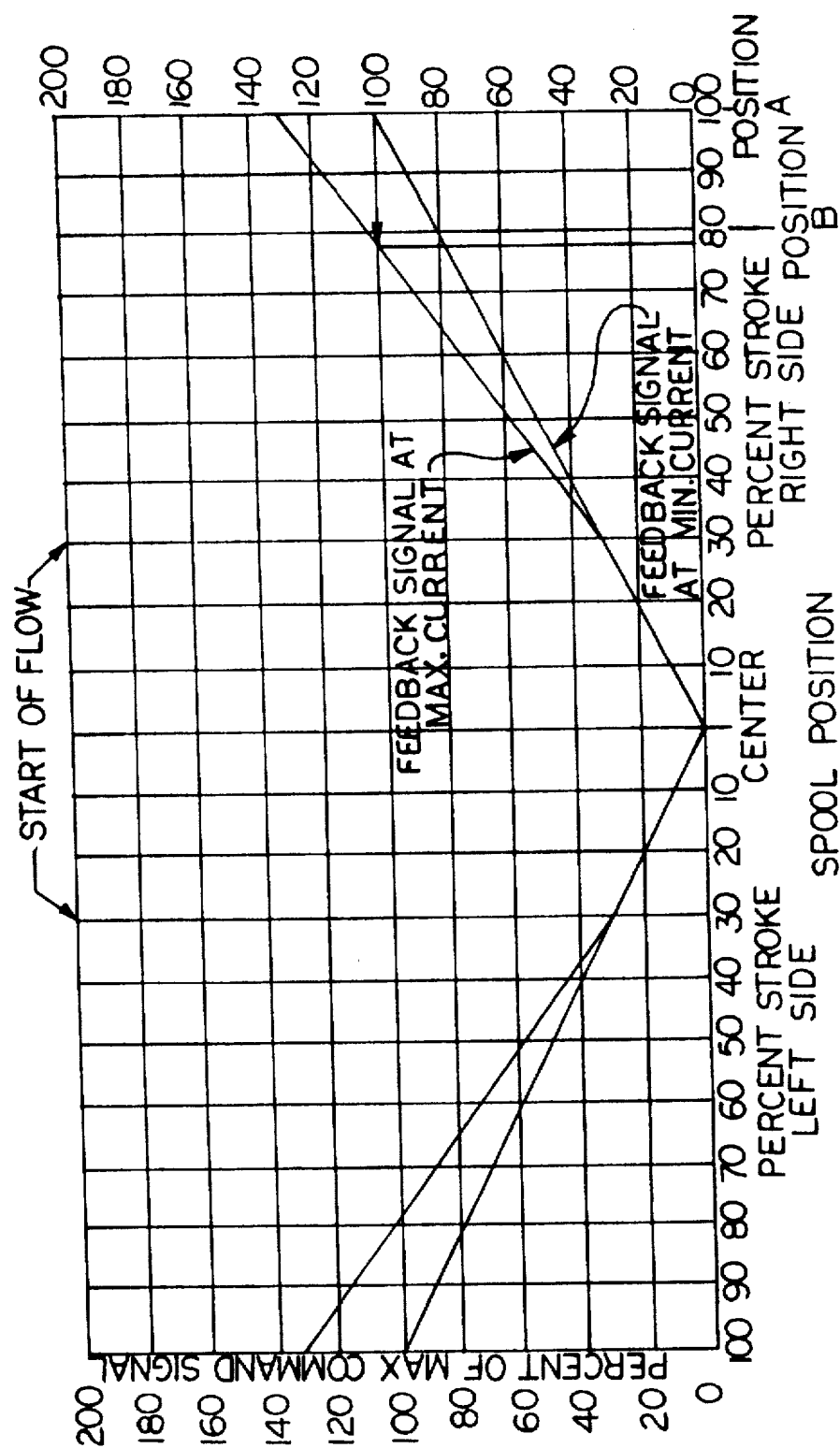
FIG. 6 is a graph showing the relationship between armature and spool position and command signal at minimum and maximum current with a positioning system according to FIG. 1 and control system according to FIG. 2.

FIG. 5 shows control loop 200 for the force motor 26 of FIG. 1 and force motor 89 of FIG. 4. The only difference between FIG. 2 and FIG. 5 is that the current feedback loop shown in FIG. 2, items 138, 140, 142, 144 and 146 have been removed; therefore, the commanded position is not modified by the current flow through the coils. The relationship between the actual spool position and the command position for a control loop according to FIG. 2 and a motor per FIG. 1 is shown in FIG. 6. The relationship between the actual spool position and the command position for a control loop according to FIG. 5 and a motor per FIG. 1 is shown in FIG. 8.

Figure 7:
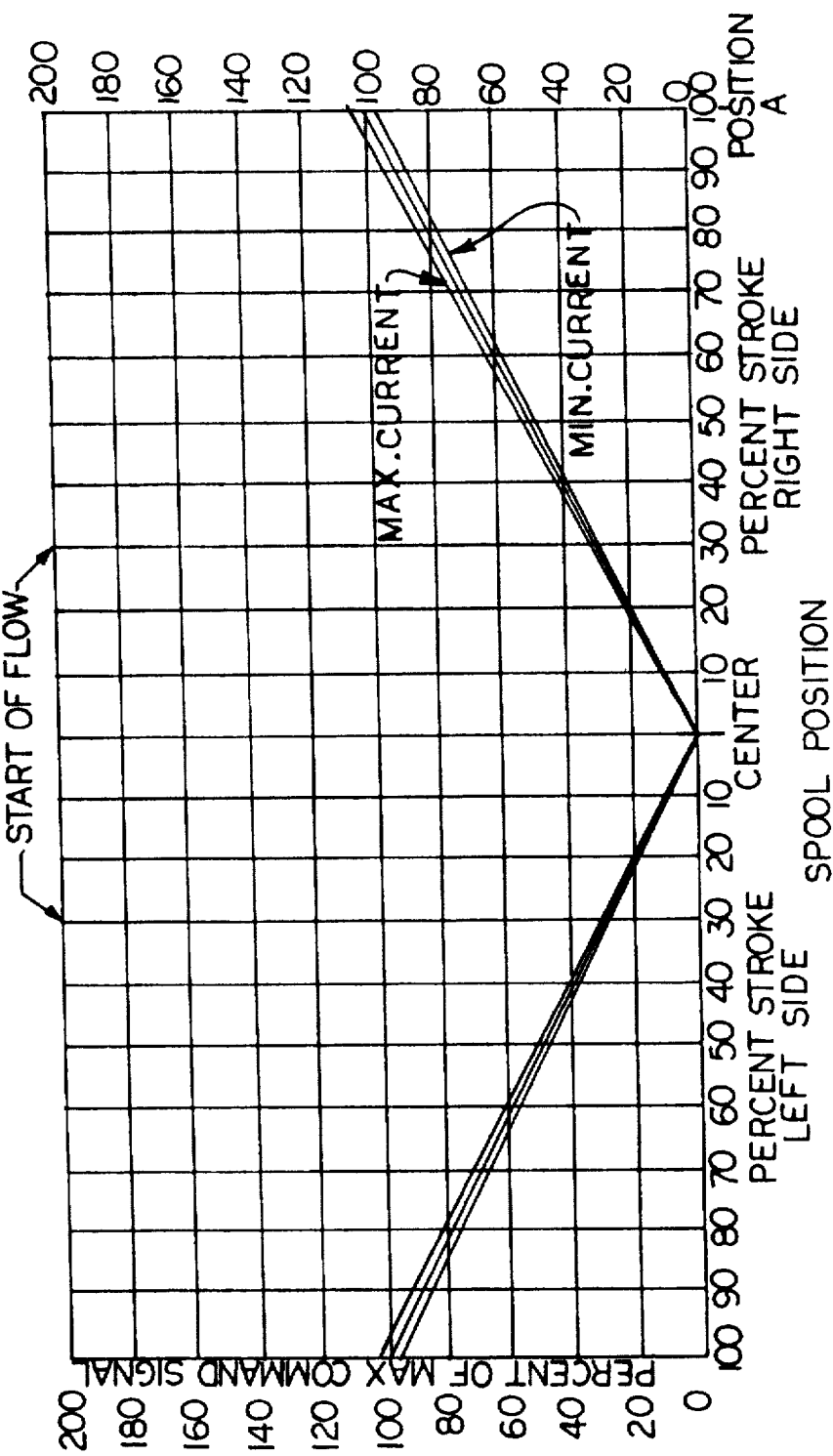
FIG. 7 is a graph showing the relationship between armature and spool position and command signal at minimum and maximum current with a positioning system according to FIG. 4 and control system according to FIG. 2.
Figure 8:
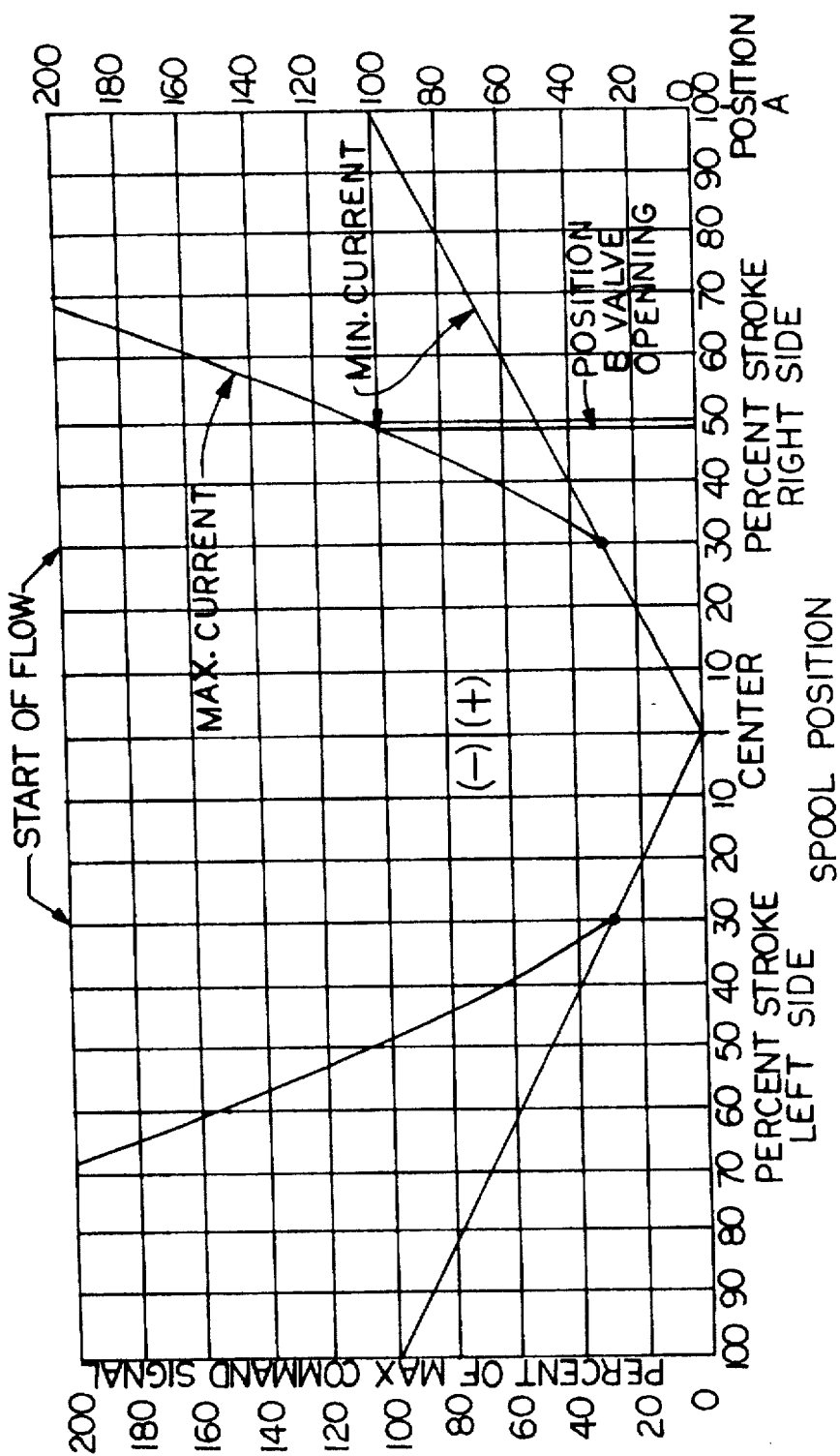
FIG. 8 is a graph showing the relationship between armature and spool position and command signal at minimum and maximum current with a positioning system according to FIG. 1 and control system according to FIG. 5.

FIGS. 6, 7, and 8 use the same coordinates and are intended to show the same relationships but with different motor and control system configurations. The horizontal axis is armature and spool position in two directions from center. To the right of center is with a plus (+) command signal. To the left of center is with a minimum (−) command signal. The amount of spool movement from center varies as a function of current though the coils. Each graph shows the relationship of armature and spool position and the control signal at minimum and maximum current. FIG. 6 is with current feedback that exactly compensates for error due to flux generated by current through the coils at the point that flow starts to a cylinder port. Because of a small increase in flux per ampere-turn as the spool moves away from center, the graph shows a small decrease in travel per unit command signal resulting in less spool travel per unit command at maximum current (Position B) as compared to at minimum current (Position A). FIG. 7 is with a motor according to FIG. 4 and control according to FIG. 2 with the only change in flux per unit command signal being due to the change in leakage at various positions. This error is very small.

FIG. 8 shows a motor according to FIG. 1 with a control system without current feedback or as shown in FIG. 5. It shows a larger decrease (compared to FIG. 6) in travel of the spool per unit command signal as the closing force due to flow force increases. As shown in the graph, this is very advantageous in a hydraulic flow control valve.

FIG. 9 shows all of the flux flow paths in the motor per FIG. 1. It is shown to explain the mathematical model.

Mathematical Description of Rectilinear Force Motor

The following is a mathematical explanation of the force motor's magnetic and spring forces and the forces required to hold the spool in place with changing flow rate or pressure drop.

The flux circuit measured by first Hall effect sensor 58 is described as follows: $F_1 = F_A + F_H + F_L$ (see FIG. 9), where $F_A$ = Clockwise flux from P.M., $F_H$ = Total flux from coil 1, and $F_L$ = The part of flux from coil 2 that passes through gap 42.

The flux circuit measured by second Hall effect sensor 60 is described as follows: $F_2 = (F_G + F_J) - F_B$, where $F_B$ = CCW flux from P.M., $F_G$ = The part of flux from coil 1 that passes through gap 44, and $F_J$ = Total flux from coil 2.

Total permanent magnet flux:

$$F_T = \frac{B_R A_m 6450}{1 + \frac{(B/H\, A_m\, R_T)}{L_m}},$$

where $B_R$ = Residual Magnetization,

B/H = Slope of demagnetization curve, $A_m$ = Area permanent magnet (P.M.), $L_m$ = Thickness of permanent magnet, $R_T$ = Total reluctance−P.M. circuit, and $$F_C = \text{Flux in P.M. flux path } C = \frac{F_T}{\left(1 + \frac{R_C}{R_M}\right)}$$

$R_A$ = Reluctance in path A $R_B$ = Reluctance in path B $R_C$ = Reluctance in path C $$R_M = \text{Reluctance in path } M = \frac{(R \text{ in path } D)(R \text{ in path } E)}{R \text{ in path } D + R \text{ in path } E}$$
(see FIG. 9 notes)

$R_F$=Reluctance across P.M.

$$F_A = \frac{F_C}{\left(1 + \frac{R_A}{R_B}\right)}$$

$F_B = F_C - F_A$ $F_H$=Total flux from coil 1

$$F_H = \frac{NI\,3.192}{R_{TC1}} \quad \begin{array}{l} N = \text{Number of turns in coil} \\ I = \text{Current through coil} \\ R_{TC1} = \text{Total reluctance in circuit} \\ \phantom{R_{TC1} =} \text{for coil 1} \end{array}$$

$F_G$ = Flux from coil 1 in gap 44

$$= \frac{F_H}{\left(1 + \frac{R_B}{R_F}\right)}$$

$F_J$ = Total flux from coil 2

$$F_J = \frac{NI\,3.192}{R_{TC2}} \quad R_{TC2} = \text{Total reluctance in circuit for coil 2}$$

$$F_L = \frac{F_J}{\left(1 + \frac{R_A}{R_F}\right)}$$

$F_L$=Flux from coil 2 in gap 42

Magnetic force calculations are as follows:

$$G_1 = B_1^2 A_1 C;\ B = \frac{F}{AC} \quad \begin{array}{l} A_1 = \text{Area of gap} \\ C = \text{Constant} \\ G_1 = \text{Force in gap 42} \end{array}$$

$G_2 = B_2^2 A_2 C$ $B_2$=Flux density in working air gap, 44

$A_2$=Area of working air gap, 44

C=Constant $G_2$=Force in gap 44

The total force needed to open the spool at any position is $G_S + G_F + G_B = G_1 - G_2 = G_M$, where $G_S$=spring force=pre-load+[(rate) (travel)], $G_F$=friction force (In proportional and servo valves, this is very small and can often be ignored), $G_B$=flow forces on spool (see below), $G_1$=magnetic force in smaller gap, $G_2$=magnetic force in larger gap, and $G_M$=Net P.M.+E.M., magnetic force.

The total force needed to close the spool at any position is $G_S = (G_1 - G_2) + G_F$

Mode of Operation

Valve assembly 12 and motor 26 are assembled to ensure that when armature 28 is at magnetic center (i.e. positioned in the center of cavity 30 so that forward gap 42 is equal to rearward gap 44), spool 22 is at hydraulic center. Spring assembly 40 biases or pre-loads armature 28 through support rod 38 to magnetic center with the drive rod 34 positioning spool 22 to hydraulic center. The physical layout of permanent magnet 48 (i.e., centered around armature 28 between first coil 54 and second coil 56) results in flux lines traveling around first coil 54 in a clockwise direction (illustrated by line 62) and around second coil 56 in a counter-clockwise direction (illustrated by line 64). The flux paths associated with the coils 54, 56 are in the same direction and add to the flux density from the permanent magnet in one gap and subtract in the other gap. With zero current through the coils, armature 28 will remain in the center position. If, however, armature 28 moves off center even slightly, for example toward forward gap 42, forward gap 42 decreases in width, the flux density associated with gap 42 becomes more positive, rearward gap 44 increases in width, and the flux density associated with gap 44 becomes less negative. Consequently, the natural tendency of armature 28 is to move off center and continue moving until stopped by pole piece 168. Thus, the force from spring assembly 40 biasing armature 28 toward center must be greater that the flux force generated by permanent magnet 48 at all armature positions.

The operation of the present invention is best illustrated by a hypothetical operation. Initially, when armature 28 is at center (see FIG. 1), spool 22 is at center. If no external forces act upon armature 28 to urge it off center, no energizing current is required to coils 54,56 because no flux force is required to supplement the biasing force of spring assembly 40 holding armature 28 in position. As explained above, since forward gap 42 equals rearward gap 44, the clockwise flux generated by permanent magnet 48 around first coil 54 is the same magnitude but opposite polarity as the counter-clockwise flux generated by the permanent magnet 48 around second coil 56. First Hall effect sensor 58 provides a voltage on line 102 to driver 110 which represents the density and direction of flux around first coil 54. Similarly, second Hall effect sensor 60 provides a voltage on line 104 to driver 111 which represents the density and direction of flux around second coil 56. The Hall sensors are arranged such that the signal polarities are opposite. Since drivers 110,111 are balanced, the inputs to difference amplifier 120 are opposite polarity and identical magnitude. These signals are combined by difference amplifier 120 to produce the "Sensed Position" signal at summing junction 130. In this example, since armature 28 is balanced at center and the sensor measurements at the inputs to difference amplifier 120 are equal in magnitude, the signals cancel and the "Sensed Position" signal is approximately zero volts. Since the "Commanded Position" signal ($V_{CP}$) is zero, the combination of the "Sensed Position" signal ($V_{SP}$) and the "Commanded Position" signal ($V_{CP}$) is also zero. Consequently, control amplifier 132, having essentially zero volts input, does not produce an output ("Compensation" signal) to coil driver 136. Thus, no energizing current is provided to first and second coils 54,56 and the total flux across each of the gaps 42,44 remains due entirely to permanent magnet 28 as described above. Also, since current compensation amplifier 144 has no input signal because no voltage is created across resistor 138, no "Sensed Current" signal ($V_{SC}$) is generated as current feedback. No current feedback under these circumstances is generated because there is no current. The purpose of $V_{SC}$, as will be described in further detail below, is to compensate for the component of the "Sensed Position" signal ($V_{SP}$) due to the flux generated by coils 54,56. Here, coils 54,56 do not contribute to $V_{SP}$ because coils 54,56 are not energized by energizing current. Thus, the closed-loop control circuit 100 simply permits armature 28 to remain in the center position under the biasing force of spring assembly 40.

Assume now that it is desired to open the servo-valve to the precise position at which fluid flow begins. Command block 150 is adjusted to provide a "Commanded Position" signal ($V_{CP}$) to summing junction 130 which, according to a predetermined relationship between command block 150 voltage and spool 22 position, corresponds to the spool 22 position shown in FIG. 3 (i.e., spool 22 is barely cracked opened). This initial "Commanded Position" signal ($V_{CP1}$) is routed to summing junction 130 where it is combined with the initial "Sensed Position" signal ($V_{SP1}$) corresponding to the initial position of armature 28. The initial "Sensed Current" signal ($V_{SC1}$) is also combined with $V_{CP1}$. Since $V_{SP1}$ and $V_{SC1}$ are both initially zero volts as described above, the "Compensation" signal at the output of current compensation amplifier 144 is directly proportional to $V_{CP1}$. As such, coil driver 136 produces energizing current. This current causes first and second coils 54, 56 to produce flux.

The direction of the energizing current in this example causes coils 54, 56 to produce flux 84, 85 in a clockwise direction as shown in FIG. 3. The flux due to coils 54, 56 (i.e., flux path 83 and 84, respectively) adds to the permanent magnet flux at gap 42 and flux in paths 82 and 85 subtracts from the permanent magnet flux at gap 44. The combined permanent magnet and E.M. flux at gap 42 is measured by first Hall effect sensor 58. The combined permanent magnet and E.M. flux at gap 44 is measured by Hall effect sensor 60. The flux at gap 42 is the clockwise permanent magnet flux shown in FIG. 1 plus the flux from both coils shown in FIG. 3. The flux at gap 44 is the counter clockwise permanent magnet flux shown in FIG. 3 minus the flux from both coils shown in FIG. 3.

The current feedback system, amplifier 144, and resistors 138, 140, 142, and 146 are designed such that the input signal at summing junction 130 will be modified by the current feedback system such that the flux density changes at sensors 58 and 60 caused by current through the coils 54 and 56 will be exactly compensated for at the point at which flow starts to port 18 or port 69. The input signal from command block 150 ($V_{CP1}$) will be summed with sensed current voltage ($V_{SC1}$) so that the command position voltage on line 160 will be modified by ($V_{SC1}$), the exact voltage change as caused by flux density changes at sensors 58 and 60 generated by flux from coils 54 and 56 when measured as sensed position ($V_{SP1}$) at summing junction 130.

When a command signal is entered into command block 150 which is predetermined to position the spool at a point to just start flow to port 18, there will be a (+) plus voltage in line 160. Before the armature 28 starts to move, the outputs of sensors 58 and 60 will be equal and opposite. Therefore, the output of difference amplifier 120 at summing junction 130 will be (0) zero. The (+) plus command voltage at junction 130 will cause a (+) plus voltage output from control amplifier 132 that is proportional to the input signal over a small range. The output signal from amplifier 132 will cause the coil driver 136 to provide (+) plus voltage to coils 54 and 56 that is also proportional to the input signal from junction 130 over a small range. When the coil driver provides (+) plus current to drive the armature, the command signal to junction 130 will be increased by an appropriate amount. As the spool and armature approach the commanded position, the (−) negative voltage of the sensed position signal ($V_{SP}$) will approach the (+) plus voltage on line 160. As the two voltages approach each other, the output of coil driver 136 will be the same polarity as the larger of the two, and proportional to the input voltage to control amplifier 132. When the command signal at junction 130 and the sensed position signal ($V_{SP}$) are close enough together to cause a proportional signal, the current will start to decrease, moving the commanded position farther away. The system will follow this moving command position until the sensed position signal voltage ($V_{SP}$) that is (−) negative is just enough less than the command signal at junction 130 but opposite polarity to supply the current required to hold the spool position against steady state forces as described above in the total magnetic force calculations. As the armature and spool move, the difference between the outputs of sensors 58 and 60 will increase as a (−) negative voltage. Drivers 110 and 111 and resistors 112, 114, 116, 118, 124 and 126 are used to adjust the gain of the output of sensors 58 and 60 and to insure that the two (2) outputs are equal at the center position of the armature 28 and spool 22. Difference amplifier 120 combines the two sensor signals into a voltage signal that increases as a (−) negative voltage as the spool moves away from center (in this case, with a (+) positive command signal). The driver 136 current output will be (+) positive and the (+) positive current will drive the armature and spool 22 to the left until the (−) negative voltage of the sensed position signal ($V_{SP}$) matches correctly with the (+) positive command signal at junction 130 to hold the spool in the required position.

If the command block 150 received a (−) negative signal sufficient to position the spool 22 such that flow starts to port 69, the control amplifier 132 will have a (−) negative input causing a (−) negative output current to coils 54 and 56 sufficient to drive the spool to the right to the position that exactly holds the spool 22 at the correct position. The function of the control system is the same as described for a (+) plus command, but all voltage polarities are reversed.

Figure 2A:
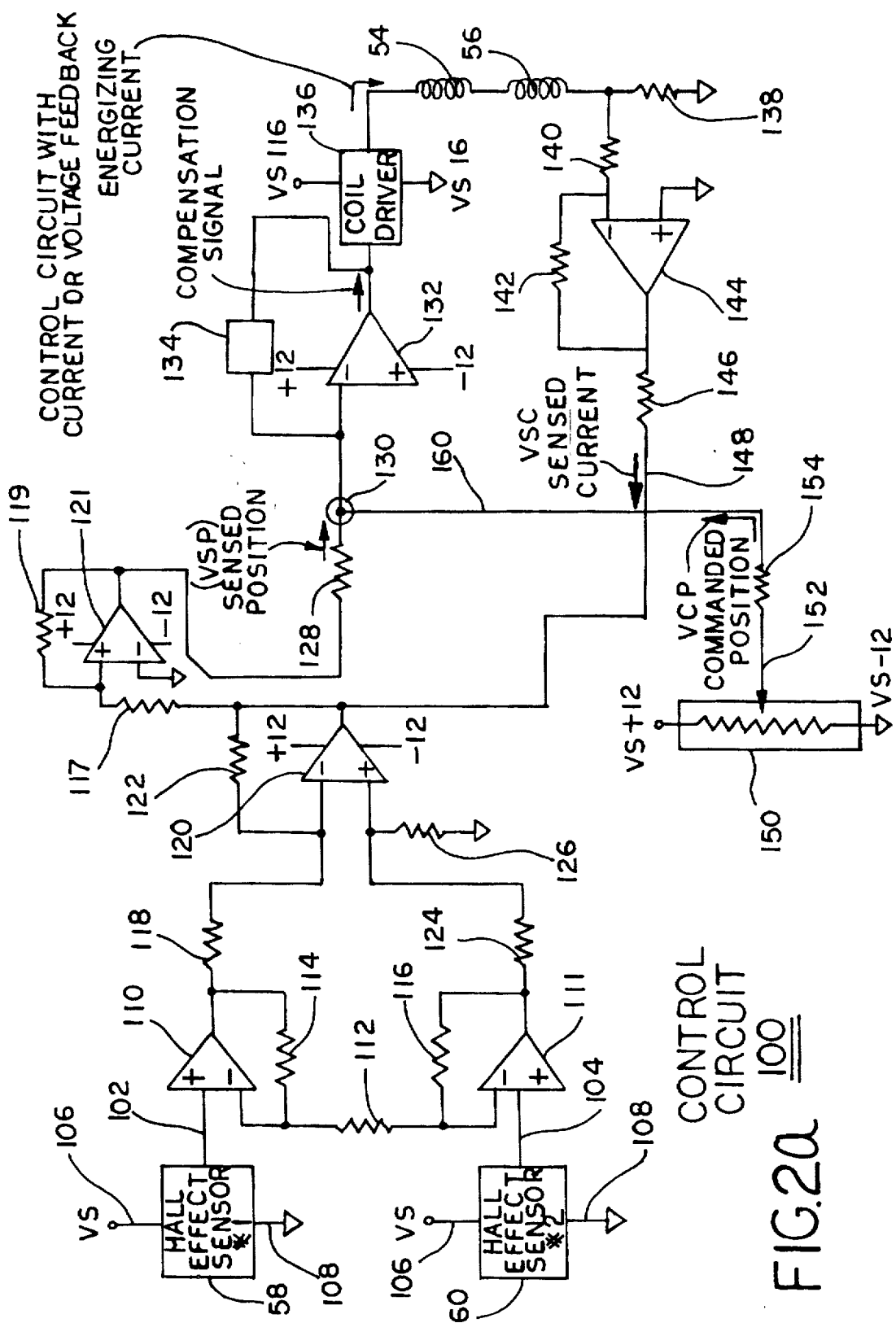
FIG. 2a is a schematic diagram similar to FIG. 2 depicting another embodiment of the current feedback circuitry.

FIG. 2a shows a preferred implementation of the current feedback system wherein the sensed current signal ($V_{SC}$), instead of being combined with the commanded position signal ($V_{CP}$), is combined with the output of difference amplifier 120. An unity gain amplifier or buffer 121, which includes resistors 117 and 119, sums these two signals an provides the resulting signal (which represents a current compensated, sensed position signal) to resistor 128. The remainder of the circuit is identical to that depicted in FIG. 2. Possible component values for the circuit of FIG. 2a are shown in the table below:

Resistors 112, 118, 122, 124, 128, 140, 142, 146, 154=100 Kohms.

Resistors 114, 116=82 Kohms.

Resistor 126=25 Kohms.

Resistor 138=5 Ohms.

Of course, one skilled in the art could readily implement the control loop of the present invention using a current comparison circuit (as opposed to voltage comparison) or a pulse-width modulated circuit.

If the spool overshoots the commanded position or if the commanded position is to return the spool to a new position closer to center or to center, the spring assembly 40 will drive the spool overcoming all forces acting on it. The centering spring will be loaded by a spring retainer. Rod 38 will transmit the spring force to the armature 28.

If the command signal had been such as to cause the spool 22 to go to the position to pass maximum flow at minimum pressure drop (i.e., the pressure drop across port 16 to port 18 plus drop from port 69 to port 72), the same sequence of events will happen as when the command signal was to cause the spool to move to the point that flow starts to port 18. The difference being that in this case, the sensed position voltage ($V_{SP}$) will go to the same higher (−) negative level to match the higher (+) plus voltage on line 160. In this case, however, the combined feedback signal at node 130 will increase as the current increases (see FIG. 6). The feedback signal from Hall effect sensors 58 and 60 include flux generated by permanent magnet 48 which is position related, and coils 54, 56, which is force related. If the command position (FIG. 2) does not change, and the feedback signal increases because the flux from coils 54, 56 increases, the armature 28 position must change to cause the command and feedback signals to again match. In FIG. 6, the arrow between the minimum current curve and the maximum current curve shows that the armature position must change from position A to position B to make the feedback signal match the command signal at the higher current level. The minimum current and maximum current curves in FIG. 6 are different because the flux density produced per ampere turn at position A is greater than at the position to start flow. In many control systems this would not be acceptable, but in a proportional or servo valve, the error causes a desirable effect. The current increases because the flow force increases with increases in pressure drop across the spool according to the formula $F=KQ\sqrt{P}$. The increase in pressure drop increases the flow rate which is generally undesirable. The increase in pressure drop and flow rate increases the force required to hold the spool in place. This causes the current to increase. The net result is that the commanded position A (see FIG. 6) at the minimum pressure drop will move to position B at maximum pressure drop and lower the flow rate at the modified position.

In hydraulic systems with a fixed pressure source at port 16, it is common to have a variable load between ports 18 and 69. This variable load causes a change in pressure drop between port 16 and one cylinder port and between the other cylinder port and port 72. The result is a change in flow rate from port 16 to port 72. This is generally very undesirable. With a valve with a motor per FIG. 1 and a control circuit per FIG. 2, spool 22 will be commanded to close per FIG. 6 with an increase in current caused by an increase in pressure drop and/or flow rate across the spool 22. This will result in a smaller change in flow rate, and is therefore very desirable in a hydraulic valve. The position error caused by a change in current across coils 54, 56 improves the performance of a hydraulic valve because the flow rate remains more nearly constant.

If the command signal had been (−) negative and of a magnitude to cause maximum flow to port B at minimum pressure drop, the sequence of events will be exactly the same as described for a (+) plus voltage except all polarities are reversed.

FIG. 5 shows a control system the same as FIG. 2 except that the current compensation system (amplifier 144, and resistors 138, 140, 142, and 146) has been removed. The control system per FIG. 2 provides current feedback such as to eliminate the change in feedback signal with changes in current through coils 54, 56, at least at one position (start of flow) as shown in FIG. 6. The control system per FIG. 5 does not include a current feedback signal. FIG. 8 shows that the resulting change in spool 22 position from position A to position B will be much larger than in FIG. 6. In proportional and servo valves, the friction force on the armature and spool will be a small percent of the total force at all working positions. The other forces acting on the spool and armature are significant. One such force is the force due to the centering spring. This force is the force due to pre-load plus the spring rate times the travel. It is obvious to those skilled in the art that this second force remains constant at each spool position. Another such force is due to flow across the spool. This force is related to the square root of the pressure drop and the first power of flow rate. This means that the only significant change in force requirement at each spool position will be due to change in pressure drop across the spool. If the pressure drop increases, the flow rate will also increase which increases the force even more. The increase in force is described by the relationship, Force=QK$\sqrt{P}$. This increase in force requires an increase in current. The increase in current causes the control system to change the commanded position reducing the spool travel from center. In many systems this will be a very large advantage even if the flow rate still has significant variation with changes in pressure drop. For example, if the spool does not change position with pressure drop, the flow rate will change by approximately four times with a change in pressure drop of 200 psi to 3000 psi. If the spool changes to reduce the opening because of change in force and current to 0.375 times the start opening, the flow will only increase by 1.5 times with a change in pressure drop of 200 psi to 3000 psi. This will be very advantageous in most applications, and with careful design of the valve and force motor it is possible to reduce the flow error with this change in pressure drop to a very small percent change, maybe zero change. The actual function of this system is the same as with current feedback except that the commanded signal does not change with current level. Feedback gain will increase with current and therefore, the higher the current, the less the spool moves with increases in command current.

FIG. 4 shows a second design arrangement for a force motor. In this configuration the two coils 54 and 56 in FIG. 1 are replaced by a single coil 160. The permanent magnet 48 in FIG. 1 is replacement by permanent magnet 162. The permanent magnet flux circuit is the same as described above and shown in FIG. 9. The electromagnetic flux circuit $F_H=F_F+F_G$, and $F_J=F_L+F_K$ according to FIG. 9 are replaced by a single circuit 86 in FIG. 4. The remainder of the function of the force motor of FIG. 4 is the same as described above for the motor of FIG. 1. Since there is only one electromagnetic circuit in the motor, and all of the flux that passes through gap 44 also passes through gap 42, the total reluctance in the circuit only changes by a very small percent because of a slight change in the total leakage around the gaps 42 and 44. The total reluctance in gaps 42 plus 44 will remain essentially constant since the actual sum of distances in gap 42 plus gap 44 are always a constant. The result of the electro-magnetic circuit change results in a rectilinear force motor that has essentially the same flux generated per ampere turn at all armature positions. Therefore, FIG. 7 shows very little change in armature and spool position with changes in current. The function of the motor of FIG. 4 with a control circuit according to FIG. 2 is the same as the function of the motor of FIG. 1 with a control circuit according to FIG. 2. This results in a rectilinear force motor with work flux density measurement that provides a general purpose closed loop positioning system when used with current feedback.

What is claimed is:

1. A valve comprising:
   a housing having a passage to accommodate fluid flow therethrough;
   a member in said housing movable to relative said passage to vary said flow through said passage;
   an armature connected to said member being rectilinearly movable within the housing along an axis to so move said member, means normally biasing said armature in one direction within said housing, one end of said armature forming a first gap with said housing, another end of said armature forming a second gap with said housing, said gaps varying in direct, inverse relationship with one another as said armature moves along said axis;

a permanent magnet secured to said housing and disposed about said armature to position said armature along said axis;

coil means secured to said housing and disposed about said armature responsive to an energizing current for controlling said movement of the armature against said biasing means;

measurement means disposed adjacent one of said first gap and said second gap for measuring a first flux density across said one gap, said measurement means producing a first output signal corresponding to said first flux density;

means for sensing said first output signal which represents the position of said armature in said housing and the position of said connected valve member relative to said passage.

2. The valve of claim 1 and positioning means for providing a command signal representative of a desired position of said armature along said axis, said output signal sensing means further producing a feedback signal representative of the amount said position signal differs from said command signal to vary said energizing current, said energizing current constituting a second output signal, said output signal sensing means also sensing said second output signal to modify said position signal to more closely match said command signal.

3. The valve of claim 2 and a second measurement means disposed adjacent the other of said first gap and second gap for measuring a second flux density across said other gap, said second measurement means producing a third output signal corresponding to said second flux density, said output signal sensing means sensing said third output signal to produce a position signal.

4. The valve of claim 3 further comprising amplifier means for converting said feedback signal and said command signal into said energizing current.

5. A method of positioning a valve member relative to a passage having an inlet and an outlet to vary fluid flow through said passage by varying the size of said outlet, wherein said valve member is connected to a spring biased armature movable axially along an axis within a housing, one end of said armature forming a first gap with said housing, the other end of said armature forming a second gap with said housing, means adjacent each gap for measuring the flux density across each gap and producing output signals corresponding to each flux density, means for sensing said output signals to produce a sensed position signal representative of the location of said armature in said housing, a permanent magnet disposed about said armature, coil means disposed about said armature responsive to an energizing current for controlling said movement of said armature against its spring bias within said housing, the method comprising:

a. Introducing a command signal to energize said coil means to locate said armature at a desired position in said housing and to position said valve member relative to said passage; and b. Maintaining said command signal while increasing the fluid pressure drop across said passage inlet and outlet to thereby cause said armature to shift from said desired position to a second desired position represented by said sensed position signal relocating said valve member relative to said passage to reduce the size of said passage outlet.

6. The method of claim 5 and including the step of producing a feedback signal representative of the amount said sensed position signal differs from said command signal to vary said energizing current to make said second desired position nearer to said first mentioned desired position.

7. A servo device comprising:

a work member;

an armature connected to said member being rectilinearly movable within a housing along an axis to so move said member, means normally biasing said armature in one direction within said housing, one end of said armature forming a first gap with said housing, and another end of said armature forming a second gap with said housing, said gaps varying in direct, inverse relationship with one another as said armature moves along said axis;

a permanent magnet means secured to said housing and disposed about said armature for producing a clockwise flux path through one of said gaps and a counter flux path through the other of said gaps to position said armature along said axis;

coil means secured to said housing and disposed about said armature responsive to an energizing current for controlling said movement of the armature against said biasing means;

measurement means disposed adjacent one of said first gap and said second gap for measuring a first flux density across said one gap, said measurement means producing a first output signal corresponding to said first flux density; and means for sensing said first output signal which represents the position of said armature in said housing and the position of said connected member.

8. The servo of claim 7 further comprising a second measurement means disposed adjacent the other of said first gap and said second gap for measuring a second flux density across said other gap, said second measurement means producing a second output signal corresponding to said second flux density, said output signal sensing means further sensing said second output signal to produce a position signal.

9. The servo of claim 8 wherein said measurement means are Hall effect sensors.

10. The servo of claim 8 further comprising positioning means for providing a command signal representative of a desired position of said armature along said axis, said output signal sensing means further producing a feedback signal proportional to the flux density across said gaps to vary said energy current to maintain said desired position.

11. The servo of claim 7 and positioning means for providing a command signal representative of a desired position of said armature along said axis, said output signal sensing means further providing a feedback signal representative of the amount said first output signal differs from said command signal to vary said energizing current, said energizing current constituting a second output signal, said output signal sensing means also sensing said second output signal to modify said first output signal to more closely match said command signal.

12. The servo of claim 11 and a second measurement means disposed adjacent the other of said first gap and second gap for measuring a second flux density across said other gap, said second measurement means producing a third output signal corresponding to said second flux density, said output signal sensing means sensing said third output signal to produce a position signal.

13. A valve comprising:

a housing having a passage to accommodate fluid flow therethrough;

a member in said housing movable relative to said passage to vary said flow through said passage;

an armature connected to said member being rectilinearly movable within the housing along an axis to so move said member, means normally biasing said armature in one direction within said housing, one end of said armature forming a first gap with said housing, another end of said armature forming a second gap with said housing, said gaps varying in direct, inverse relationship with one another as said armature moves along said axis;

a permanent magnet means secured to said housing and disposed about said armature for producing a clockwise flux path through one of said gaps and a counterclockwise flux path through the other of said gaps to position said armature along said axis;

coil means secured to said housing and disposed about said armature responsive to an energizing current for controlling said movement of the armature against said biasing means;

measurement means disposed adjacent one of said first gap and said second gap for measuring a first flux density across said one gap, said measurement means producing a first output signal corresponding to said first flux density;

means for sensing said first output signal which represents the position of said armature in said housing and the position of said connected valve member relative to said passage.

14. The valve of claim 13 further comprising a second measurement means disposed adjacent the other of said first gap and said second gap for measuring a second flux density across said other gap, said second measurement means producing a second output signal corresponding to said second flux density, said output signal sensing means further sensing said second output signal to produce a position signal.

15. The valve of claim 14 wherein said coil means includes a first coil and a second coil, said first coil being disposed adjacent said first gap, said second coil being disposed adjacent said second gap, said permanent magnet being disposed between said first coil and said second coil.

16. The valve of claim 14 wherein said coil means is a single coil.

17. The valve of claim 16 wherein said coil is disposed between said armature and said permanent magnet.

18. The valve of claim 14 wherein said output signal sensing means includes difference amplifier means connected to each of said measurement means, said difference amplifier means for producing a sensed position signal representing the difference between said first and second output signals, said difference amplifier means providing said sensed position signal to said output signals sensing means.

19. The valve of claim 18 wherein one of said first and said second output signals has a positive magnitude and the other of said first and said second output signals has a negative magnitude.

20. The valve of claim 14 wherein said measurement means are Hall effect sensors.

21. The valve of claim 14 further comprising positioning means for providing a command signal representative of a desired position of said armature along said axis, said output signal sensing means further producing a feedback signal proportional to the flux density across said gaps to vary said energy current to maintain said desired position.

* * * * *